United States Defensive Publication [19] (H) [11] T104,402

Majewicz [43] Jul. 3, 1984

[54] THICKENING OF HEAVY BRINE SOLUTIONS

[76] Inventor: Thomas G. Majewicz, R.D. 1, Box 285, Chadds Ford, Pa. 19317

[21] Appl. No.: 451,522

[22] Filed: Dec. 20, 1982

[51] Int. Cl.[3] ..... C09K 3/00

[52] U.S. Cl. ..... 252/8.55 R; 536/91

[57] ABSTRACT

Thickening of heavy brine solutions based on calcium halides by use of carboxymethyl hydroxyethyl cellulose is disclosed wherein the carboxymethyl substitution level is about 0.05 to 0.35.

1 Claim, No Sheets Drawing,

7 Pages Specification

The file of this unexamined application may be inspected and copies thereof may be purchased (849 O.G. 1221, Apr. 9, 1968).